(12) United States Patent
Scalise et al.

(10) Patent No.: US 7,978,918 B2
(45) Date of Patent: Jul. 12, 2011

(54) DIGITAL IMAGE CROPPING USING A BLENDED MAP

(75) Inventors: Anthony Scalise, Fairport, NY (US);
Robert B. Poetker, Penfield, NY (US);
Kevin R. Delong, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/773,362

(22) Filed: May 4, 2010

(65) Prior Publication Data

US 2010/0215259 A1   Aug. 26, 2010

Related U.S. Application Data

(62) Division of application No. 11/489,966, filed on Jul. 20, 2006, now abandoned.

(51) Int. Cl.
*G06K 9/34* (2006.01)
*G06K 9/32* (2006.01)
*G06K 9/46* (2006.01)

(52) U.S. Cl. ........ 382/228; 382/164; 382/173; 382/194; 382/199; 382/282; 348/77

(58) Field of Classification Search ........................ None
See application file for complete search history.

(56) References Cited

U.S. PATENT DOCUMENTS

| | | | |
|---|---|---|---|
| 4,203,671 A | 5/1980 | Takahashi et al. | |
| 5,781,276 A | 7/1998 | Zahn et al. | |
| 6,282,317 B1* | 8/2001 | Luo et al. | 382/203 |
| 6,529,630 B1* | 3/2003 | Kinjo | 382/190 |
| 6,654,506 B1 | 11/2003 | Luo et al. | |
| 2002/0076100 A1* | 6/2002 | Luo | 382/164 |
| 2004/0215832 A1 | 10/2004 | Gordy et al. | |
| 2004/0218832 A1* | 11/2004 | Luo et al. | 382/274 |
| 2005/0025387 A1* | 2/2005 | Luo | 382/298 |
| 2005/0169520 A1* | 8/2005 | Chen et al. | 382/165 |
| 2006/0182348 A1* | 8/2006 | Kinjo | 382/203 |

OTHER PUBLICATIONS

Journal of Society of Photographic Science and Technology of Japan, "Color Image Quantization Based on Physics and Psychophisics", vol. 59, No. 1, pp. 212-225, 1996.
Haiyuan Wu, "Face Detection and Rotations Estimation Using Color Information", the 5th IEEE International Workshop on Robot and Human Communication, 1996, pp. 341-366.
"Region-Based Template Deformation and Masking for Eye-Feature Extraction and. Description", Jyh-Yuan Deng and Peipei Lai, Pattern Recognition, vol. 30, No. 3, pp. 403-419,1997.
"Generalized likelihood ratio-based face detection and extraction of mouth features", C. Kervrann, F. Davione, P. Perez, R. Forchheimer, C. Labit, Pattern Recognition Letters 18 (1997)899-912.
"Face Detection From Color Images Using a Fuzzy Pattern Matching Method", Haiyuan Wu, Qian Chen, and. Masahiko Yachida, IEEE Transactions on Pattern Analysis and Machine Intellegence, vol. 21, No.6, Jun. 1999.

(Continued)

*Primary Examiner* — John W Lee
(74) *Attorney, Agent, or Firm* — Raymond L. Owens

(57) ABSTRACT

An improved method for cropping a main subject from a digital image is disclosed. A skin color map and face map are independently computed and then blended to produce a revised map. A region map is computed by segmenting the digital image into a plurality of regions. A main subject importance map is calculated from the revised map and the region map. The digital image is cropped based on the main subject map.

4 Claims, 3 Drawing Sheets

OTHER PUBLICATIONS

"Human Face Detection in a Complex Background", Guangzheng Yang and Thomas S. Huang, Pattern Recognition, vol. 27, No. 1, pp. 53-63. 1994.

"A Fast Approach for Detecting Human faces in a Complex Background", Kin-Man Lam, Proceedings of the 1998 IEEE International, Symposium on Circuits and System, 1998, ISCAS'98 vol. 4, pp. 85-88.

Ming Hsuan Yang, David Kriegman, and Narendra Ahuja, "Detecting Faces in Images: A Survey", *IEEE Transactions on Pattern Analysis and Machine Intellegence* (*PAMI*), vol. 24, No. 1, pp. 34-58, 2002.

* cited by examiner

DIGITAL IMAGE CROPPING USING A BLENDED MAP

CROSS REFERENCE TO RELATED APPLICATIONS

This is a divisional of prior U.S. Ser. No. 11/489,966, filed on Jul. 20, 2006 now abandoned, which is hereby incorporated by reference in its entirety.

Reference is made to commonly assigned, U.S. patent application Ser. No. 11/489,965, entitled: MACHINE-CONTROLLED IMAGE CROPPING WITH DEFAULT, filed Jul. 20, 2006, in the names of Anthony Scalise, Robert B. Poetker, Kevin R. Delong.

FIELD OF THE INVENTION

The present invention is related to image processing, and in particular to image cropping for producing an image of a desired aspect ratio.

BACKGROUND OF THE INVENTION

Methods are known that provide machine-controlled cropping of digital images. The term "machine-controlled" is used herein to refer to an automated process performed by machine, such as a programmed computer, without human intervention. Machine-controlled cropping can be arbitrary relative to image content, but that approach has the risk that a main subject in an image will be cropped.

U.S. Pat. No. 6,282,317, to Luo et al, discloses a method, in which a main subject in a digital image is detected. The image is segmented into regions of arbitrary shapes. The regions are grouped into larger regions based on similarity measures, and are further grouped by purposive grouping, in which the regions are evaluated for their saliency using structural saliency features and semantic saliency features. The evidences of both types of saliency features are integrated using a Bayes net reasoning engine to yield a final belief map of the main subject. In one embodiment, the semantic saliency feature detection includes use of a skin detector, followed by use of a face detector in detected skin regions.

U.S. Pat. No. 6,654,506, to Luo et al, and U.S. Patent Application Publication No. US2005/0025387 A1 use the main subject detector of U.S. Pat. No. 6,282,317 in machine-controlled cropping of images. The output of the main subject detector can be thresholded using a clustering process to provide high, medium, and low values corresponding to a main subject, secondary subject, and background. These approaches have the shortcoming that the cropping provided is sometimes excessive.

It would thus be desirable to provide improved methods, computer program products, and systems that overcome these shortcomings.

SUMMARY OF THE INVENTION

The invention is defined by the claims. The invention, in broader aspects, provides a method and system for mapping a digital image having a plurality of pixels, in which a skin color map of the digital image is computed. The skin color map has a plurality of skin color values. Each of the skin color values is associated with a respective set of one or more of the pixels. Each of the skin color values indicates a likelihood that the respective pixel set is skin. A face map of the digital image is generated. The face map is divided into one or more face zones and a background exclusive of the face zones. Each of the face zones is a group of the pixels. Each of the face zones indicates a greater likelihood than the background that the respective group of pixels is a face. In the skin color map, the respective skin color values associated with the pixels of the face zones are increased to provide a revised map, which is used in controlling a procedure producing an output.

It is an advantageous effect of the invention that an improved methods, computer program products, and systems are provided that can have a reduced risk of overcropping desired subject matter in digital images.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
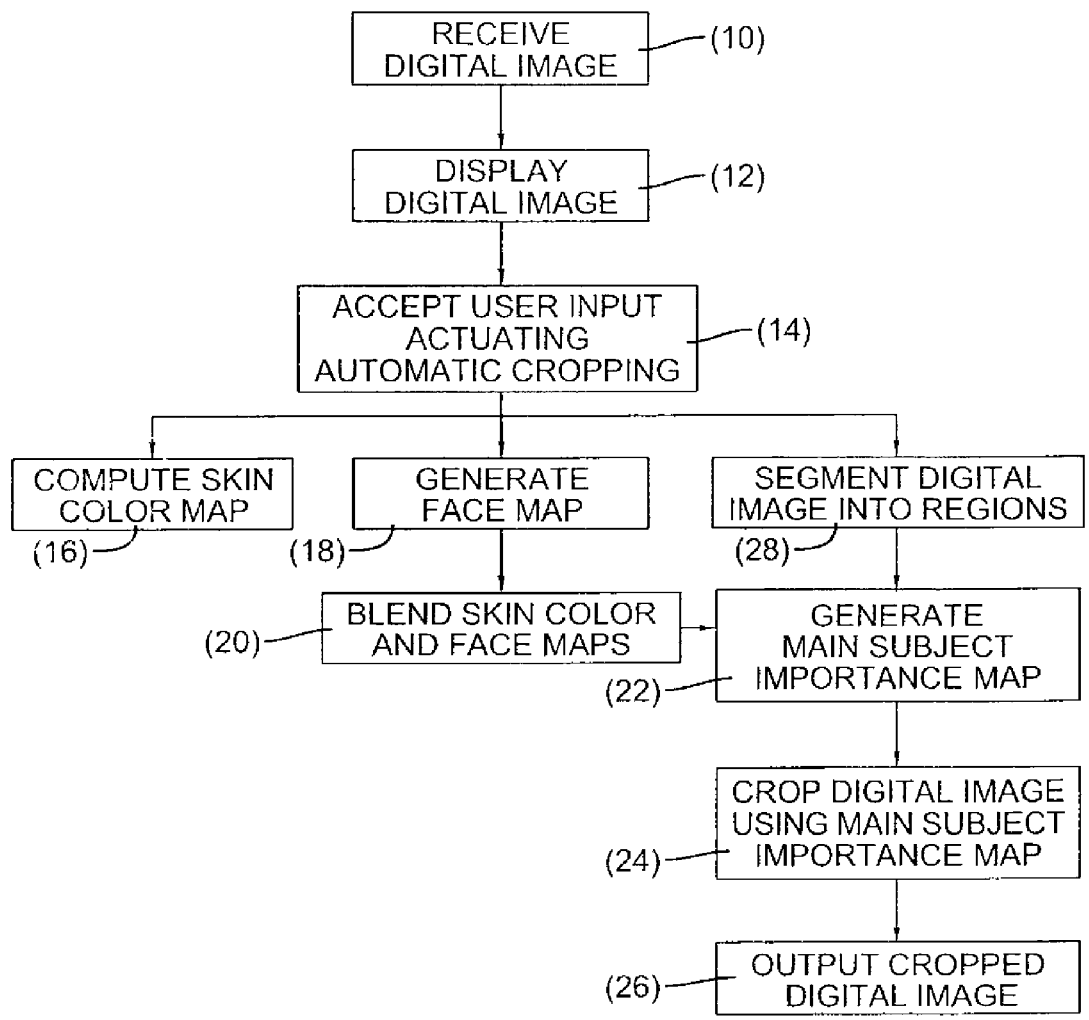
FIG. 1 is a flow chart of an embodiment of the cropping method.

In the following two different methods are described. One method is directed to digital image cropping or production of other output using a blended map. The other method is directed to machine-controlled image cropping with default cropping. A particular embodiment discussed at length herein, incorporates both of the above methods. Claims herein are directed to one of the methods. The other method has been claimed in the above-cross referenced application. The same applies to systems and computer program products.

In the first method, a skin color map having a plurality of skin color values is computed. Each of the skin color values indicates a likelihood that respective set of one or more pixels of the map are skin colored. A face map of the digital image is generated. The face map has one or more face zones and a background exclusive of the face zones. Each face zone indicates that a respective group of pixels has a greater likelihood of being a face than do the pixels of the background. The skin color map and face map are blended together by increasing skin color values the pixels of the face zones. The resulting revised map is used, directly or indirectly, to control a procedure producing an output, such as cropping the original digital image without user intervention.

The second method is directed to solving a problem in image editing in a computer or other device that provides machine-controlled cropping of a displayed image based upon a user input. There is an inherent assumption that the user input reflects an intent by the user to rely upon the machine-controlled cropping. This assumption does not consider that the user has manually selected automatic (machine-controlled) cropping of the displayed image. The manual selection of automatic cropping is likely to be based upon a review of the displayed image and a determination by the user that the displayed image needs to be cropped. This presents a problem if the machine-controlled cropping determines that a best result is no cropping or cropping that is not easily noticeable. The second method described here solves this problem by cropping using a default crop when a user requests machine-controlled cropping of a displayed image and a cropping determination provides a best result indicating no noticeable cropping. The default crop overrides the best result provided by machine-control on the assumption that user intent calls for cropping.

In the following description, the invention or some parts of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Digital still and video camera and database hardware features are likewise well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 3:
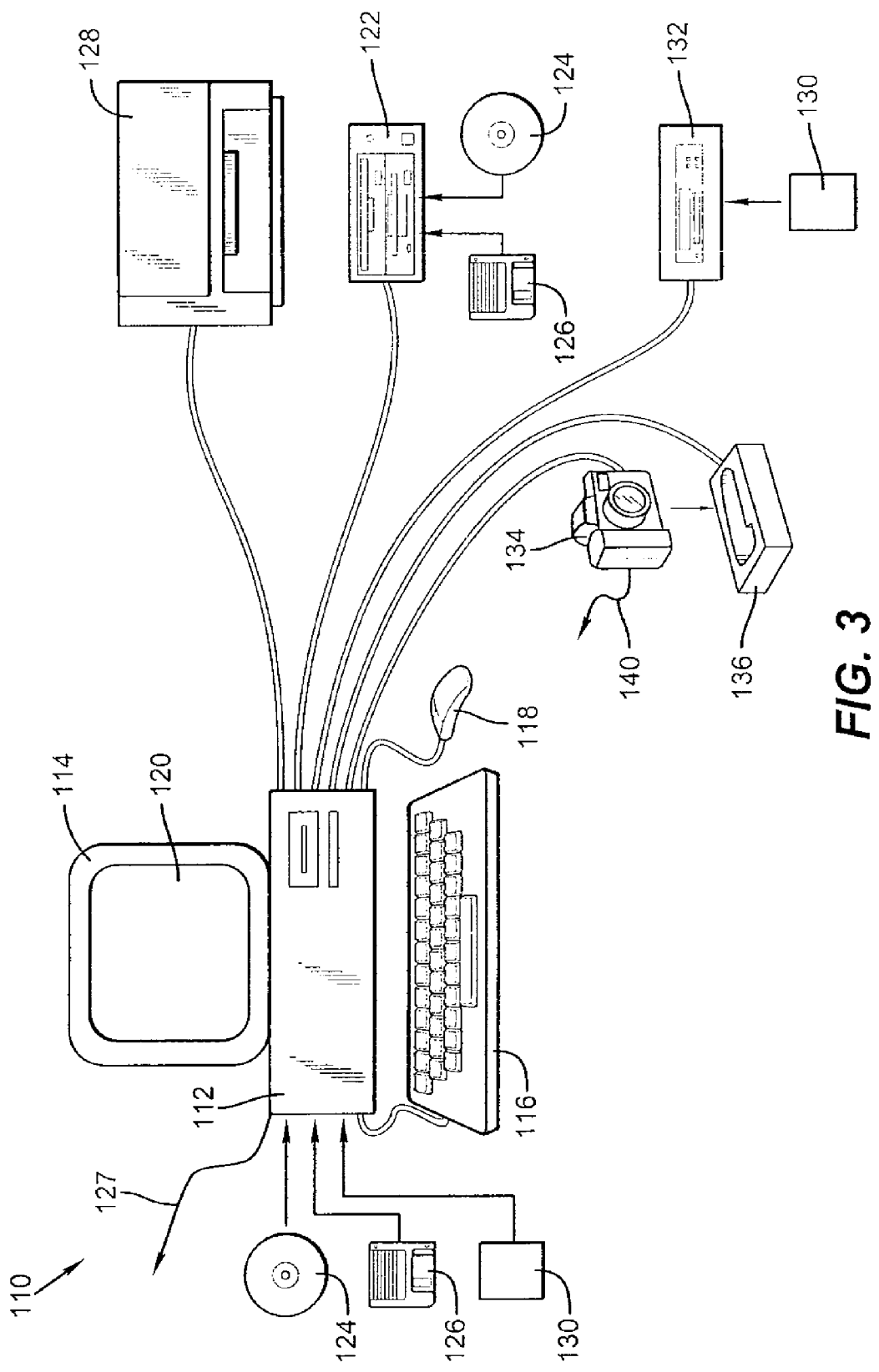
FIG. 3 is a semi-diagrammatical view of an embodiment of the cropping apparatus.

The present invention can be implemented in computer hardware and computerized equipment. For example, the method can be performed using a system including one or more scanners or other capture devices and one or more personal computers. Referring to FIG. 3, there is illustrated a computer system 110 for implementing the present invention. Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art. Other input tools, such as touch screens are well known to those of skill in the art.

Removal memory, in any form, can be included and is illustrated as a compact disk-read only memory (CD-ROM) 124, which can include software programs, is inserted into the microprocessor based unit for providing a means of inputting the software programs and other information to the microprocessor based unit 112. Multiple types of removal memory can be provided (illustrated here by a floppy disk 126) and data can be written to any suitable type of removable memory. Memory can be external and accessible using a wired or wireless connection, either directly or via a local or large area network, such as the Internet. Still further, the microprocessor-based unit 112 may be programmed, as is well known in the art, for storing the software program internally. A printer 128 or other output device can also be connected to the microprocessor-based unit 112 for printing a hardcopy of the output from the computer system 110. The microprocessor-based unit 112 can have a network connection 127, such as a telephone line or wireless link, to an external network, such as a local area network or the Internet.

Images may also be displayed on the display 114 via a memory card, such as a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112. The present invention can be used with multiple capture devices that produce digital images. For example, FIG. 3 can represent a digital photofinishing system or kiosk having a scanner.

The output device provides a final image or output signal. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

A digital image includes one or more digital image channels or color components. Each digital image channel is a two-dimensional array of pixels. Although a digital image channel is described as a two dimensional array of pixel values arranged by rows and columns, those skilled in the art will recognize that the present invention can be applied to non-rectilinear arrays with equal effect and that the present invention can be applied to, but is not limited to, a digital image channel for any of the herein-mentioned applications.

As used herein, the term "digital image" refers to the two-dimensional arrays of all of the channels, or any individual array, or any portion of an array that is treated separately. Each frame of an image sequence, such as a video sequence, is also considered a "digital image".

For convenience, digital images are generally discussed herein in terms of either a two-dimensional array of red, green, and blue pixel values or an array of monochromatic values corresponding to light intensities. A convenient resolution for purposes of discussion is an image of 1024 rows of pixels and 1536 lines of pixels, although those skilled in the art will recognize that digital images of different resolutions and dimensions may be used with equal, or at least acceptable, success. The same is true of other combinations of image channels.

With regard to matters of nomenclature, the value of a pixel of a digital image located at coordinates (x,y), referring to the xth row and the yth column of the digital image, shall herein comprise a triad of values $[r(x,y), g(x,y), b(x,y)]$ respectively referring to the values of the red, green and blue digital image channels at location (x,y). In this regard, the digital image is considered to comprise red, green, and blue two-dimensional arrays or red, green, and blue channels. A luminance channel p can be formed from the color channels. The value of a pixel of a digital image channel n located at coordinates (x,y), referring to the xth row and the yth column of the digital image channel, shall herein be a single value referred to as p(x,y).

The general control computer shown in FIG. 3 can store a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program can also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 3 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web.

In each context, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

Referring to FIG. 1, in the method, a digital image is received (10) and displayed (12) and a user input actuating automatic (machine-controlled) cropping is accepted (14). Skin color and face maps are then produced (16, 18) and combined (20) into a revised map (also referred to as a "blended map") and, optionally used in providing (22) a main subject map, then cropping (24) the digital image based on the main subject map, and then outputting (26) the cropped digital image. The main subject map has regions determined in an earlier segmentation (28).

The blended map can be used directly or indirectly to control an output. Direct uses of the blending map include: image modification, classification, and applying specific user preferences to identified sets of pixels. A specific example of a direct use is to brighten pixel values of a digital image proportional to the skin color values of the revised map. Indirect uses include: use as an input in preparation of another map of the digital image, and as input criteria for extracting faces from an image. A specific example of an indirect use is illustrated in FIG. 1 and discussed below in detail.

The digital image can be provided by the user, either individually or as one of a group of images, or the digital image can be provided by other means, independent of the user. For example, the digital image can be supplied to the user's computer, camera, or other device by a service that periodically uploads images from a shared archive, via a network.

As a preliminary matter, a determination can be made as to whether the digital image is currently compressed. If the digital image is found to be compressed, the digital image is decompressed. Protocols for determining whether images are currently compressed are well known to those of skill in the art. For example, digital images can be provided as digital files that include image information along with metadata indicating the status of the file as compressed or non-compressed, along with information necessary to decompress the image and other metadata related to the image.

The digital image can optionally be processed initially or at a later time by a scene balance algorithm. The scene balance algorithm can be any of the known scene balance algorithms, such as the Evans gray world algorithm, the LATD brightness algorithm, the Kwon color scene balance algorithm, or any other scene balance algorithm.

One of the face map and skin color map can be produced from the other, but both maps are preferably produced independently. This has an advantage that shortcomings of one can be made up for by the other. For example, skin areas missed by the skin color map procedure due to heavy shading of part of a face can be found by the face map procedure. Another advantage is that support for interactions between software and hardware providing the two maps is not necessary. This allows use of modular software components, which can be modified or replaced independent of each other. This also allows provision of the maps at different times and in different hardware as convenient. For example, a face map produced earlier for another purpose, can be saved and used with a skin color map produced when needed. Likewise, preparation of the different maps can be separated in different devices.

FIG. 1 illustrates an embodiment having a first phase, in which a main subject importance map is created using the blended map and a second phase, in which the main subject importance map is used to crop an image. In the first phase, skin color and face maps are produced from a digital image, along with a region map of the digital image. On the same basis as earlier discussed in relation to the other maps, it is preferred that the region map is produced independently of the skin color and face maps and is further preferred that all of the skin color, face, and region maps are produced independently.

Any skin color detection algorithm that assigns skin color values to sets of one or more of pixels of the digital image can be used. The skin color values taken together provide a skin color map that directly corresponds to the digital image. For convenience, and as discussed below in greater detail, the methods are generally discussed herein as if the maps were produced using full resolution versions of the original digital image. This can be done, but it may be more convenient to base one or more of the maps on a reduced resolution image sampled from the original digital image. Thus, the skin detection algorithm can assign a respective skin color value to each pixel of the digital image or to each pixel of a reduce resolution copy. The skin detection algorithm can also assign each skin color value to a group of pixels of either the original digital image or the reduced resolution copy. In any case, each skin color value is associated with a set or one or more pixels of the original image.

Each of the skin color values indicates a likelihood that the respective pixel set is skin. Examples of such algorithms are disclosed in U.S. Pat. Nos. 4,203,671 and 5,781,276. Lee, "Color image quantization based on physics and psychophysics," Journal of Society of Photographic Science and Technology of Japan, Vol. 59, No. 1, pp. 212-225, 1996 discloses a skin detection algorithm that utilizes color image segmentation and a pre-determined skin distribution in a chrominance space. The skin region classification is based on Maximum Likelihood Estimation (MLE) according to the average color of a segmented region. The conditional probabilities are mapped to a belief value via a sigmoid belief function.

U.S. Patent Application Publication No. 2005/0025387 A1, filed by Luo, discloses a skin detection algorithm that utilizes color image segmentation and a pre-determined skin distribution in a specific chrominance space. The skin region classification is based on maximum probability according to the average color of a segmented region in the predefined chrominance space. The skin probabilities are mapped to a belief output via a Sigmoid belief function, which serves as a "soft" thresholding operator. Other skin detection procedures can be used, including procedures that consider factors other than color, such as texture. The skin color detection algorithm detects face pixels, but only as skin color pixels that are undifferentiated from other non-face skin color pixels.

In a particular embodiment, the skin color detection procedure used is one described in U.S. Patent Application Publication No. 2004/0218832 A1, filed by Luo et al., which is hereby incorporated herein by reference. In that procedure, the pixel RGB values of the digital image are converted to Lst coordinates by the following equations:

$$L=(R+G+B)/\text{sqrt} \quad (3)$$

$$s=(R-B)/\text{sqrt} \quad (2)$$

$$t=(2G-R-B)/\text{sqrt} \quad (6)$$

For each pixel in the image, the probability that it is a skin pixel is computed. The skin pixel probability is derived from the pixel's coordinates in the Lst space, based on skin probability density functions stored in the algorithm. These skin probability density functions were constructed based on a collection of data for the color-space distributions of skin and non-skin regions in a large collection of scene balanced images. (The digital image, unless already scene balanced, is initially scene balanced in this procedure.) Equivalent functions can be determined heuristically using a general image collection or a collection matched to expectations of characteristics of future images. The conditional probability that a pixel is a skin pixel given its Lst coordinates is:

$$Pr(\text{Skin}|L,s,t)=Pr(\text{Skin}|L)*Pr(\text{Skin}|s)*Pr(\text{Skin}|t)$$

where each of the conditional distributions $Pr(\text{Skin}|L)$, $Pr(\text{Skin}|s)$, $Pr(\text{Skin}|t)$ were constructed by application of Bayes Theorem to the original training distributions for skin and non-skin pixels. The conditional probability that a pixel is a skin pixel, $Pr(\text{Skin}|L,s,t)$, can be used directly, or the fully decomposed form of Equation 4, or a partially decomposed form of $$Pr(\text{Skin}|L,s,t)=Pr(\text{Skin}|L)*Pr(\text{Skin}|s,t)$$

where $Pr(\text{Skin}|s,t)$ represents a non-separable probability density function. The collection of probabilities for all pixels forms a skin probability distribution for the input image. The skin probability distribution is thresholded to create a binary map such that each pixel is designated as either skin or non-skin. The thresholding is accomplished using an image-dependent adaptive thresholding algorithm, such that a skin probability threshold is customized for the particular image. Conventionally, a fixed threshold is used for all input images. The major drawback of a fixed threshold is the ignorance of the changing statistics in individual images due to changes in image content and imaging condition. Pixels with higher probability than the threshold are identified as skin pixels while all others are considered non-skin pixels. Labeling the pixels of the cropped image as skin or non-skin produces a binary skin color pixel map for the image.

Any face detection algorithm that identifies groups of pixels as the location of a face within the image can be used. In the face detection algorithm, one or more groups of pixels, each referred to herein as a "face zone" or face, are each assigned a relatively high face belief value and the remainder of the digital image, referred to as the "background", is assigned a relatively low face belief value. Each belief value indicates a likelihood that the respective face zone or the background is part of a face. Many human-face detection algorithms have been proposed in the literature, including the use of so-called eigenfaces, face template matching, deformable template matching, and neural network classification. Some face detection procedures make use of some salient features, such as eyes, mouth, and nose, and the inherent geometric positional relations among the salient features, the symmetric character of the human face, and complexion features of human face. For instance, a method is described in Haiyuan Wu, "Face Detection and Rotations Estimation using Color Information.", the 5th IEEE International Workshop on Robot and Human Communication, 1996, pp 341-346, in which a method is, given for utilizing human face features (two eyes and the mouth) and relations among the features to detect human face. U.S. Pat. No. 6,829,384, to Schneidermann, which is hereby incorporated herein by reference, discloses a method in which a quantized wavelet transform is used with multiple view detectors. Each view detector is directed to a different facial orientation relative to the plane of the image.

Other examples of face detection procedures include: "Region-Based Template Deformation And Masking For Eye-Feature Extraction And. Description", JYH-YUAN DENG and PEIPEI LAI, Pattern Recognition, Vol. 30, No. 3, pp. 403-419, 1997; "Generalized likelihood ratio-based face detection and extraction of mouth features", C. Kervrann, F. Davoine, P. Perez, R. Forchheimer, C. Labit, Pattern Recognition Letters 18 (1997)899-912; "Face Detection From Color Images Using a Fuzzy Pattern Matching Method", Haiyuan Wu, Qian Chen, and Masahiko Yachida, IEEE Transactions On Pattern Analysis And Machine Intelligence, Vol. 21, No 6, June 1999; "Human Face Detection In a Complex Background", Guangzheng Yang and Thomas S. Huang, Pattern Recognition, Vol. 27, No. 1, pp. 53-63. 1994; and "A Fast Approach for Detecting Human faces in a Complex Background", Kin-Man Lam, Proceedings of the 1998 IEEE International, Symposium on Circuits and System, 1998, ISCAS'98 Vol. 4, pp 85-88; and Ming-Hsuan Yang, David Kriegman, and Narendra Ahuja, "Detecting Faces in Images: A Survey", *IEEE Transactions on Pattern Analysis and Machine Intelligence (PAMI)*, vol. 24, no. 1, pp. 34-58, 2002. Each of these approaches has advantages and disadvantages, which can be considered in selecting among them. It is expected that use of a more accurate face detector results in a more accurate blended map.

Scales of all of the maps can be manipulated as is convenient. For example, the face map can be produced at the same scale as the skin color map or can be generated from a sub-sampled copy of the digital image and then rescaled to match the skin color map.

The skin color detector and face detectors are generally described herein in relation to detection of human skin and human faces. The detectors can be configured to detect pet skin and faces. The definition of "skin" as used herein, thus, includes fur, feathers, and the like, and "face" is comparable in scope. Individual detectors can be provided for different types of "skin" and "face" or suitable features can be provided in a single detector. For example, a skin detector can include a texture analyzer to differentiate human skin from fur or hair.

The skin color map and face map are blended together by increasing skin color values that are associated with pixels of the face zones to provide the revised map. In a particular embodiment, the skin color values of the face zones are increased to a maximum. For example, if the skin color values are probabilities from 0 to 1.0, the increase in the face zones is to 1.0. The advantage of increasing the skin color values in the face zones is that a simple output is provided that takes into account the general importance of faces in scenes, while also considering other skin areas, such as necks and hands. The revised map can be used in the same manner as a skin color map. This allows interchangeability with a skin color map in procedures that uses a skin color map as input, for example, adjusting brightness of an image based on exposure of faces. The revised map also has the advantage that the increase in skin color values in the face zones to a maximum tends to differentiate facial skin from other areas in the image marked as skin. This is in accord with the understanding that faces are generally most important in images. The revised map also differentiates facial skin against a skin colored background, such as some paneling and painted walls, tungsten illumination on a neutral color object, and sand on a beach.

Referring again to FIG. 1, in a particular embodiment, the digital image is segmented into regions having homogeneous properties. The segmenting is preferably based on color and lightness. A variety of segmentation methods can be used. General considerations, used by those of skill in the art in selecting a segmentation method, apply here. For example, a segmentation method that provides a large number of segments presents an increased computational burden relative to a method that provides a smaller number of segments and presents a risk of disparate treatment of areas that are better grouped into a single region. Segmentation into arbitrarily shaped regions provides the advantages in terms of increased accuracy in measurement of the size, shape, color, texture, and location of objects and the spatial relationship among objects; and in classification of key subject matters. The segmentation method used can be relatively simple. An example of a segmentation method is the adaptive Bayesian color segmentation algorithm disclosed by Luo et al., "Towards physics-based segmentation of photographic color images," Proceedings of the IEEE International Conference on Image Processing, 1997.

In a particular embodiment, the segmentation procedure has two stages, a first stage generating a large number of regions and a second stage combining smaller regions into larger regions. Such an algorithm is disclosed in U.S. Pat. No. 6,282,317, which is hereby incorporated herein by reference. In a first stage of segmentation, an initial division of the image into regions is obtained. In this step, a color histogram of the image is computed and then partitioned into a plurality of clusters that correspond to distinctive, prominent colors in the image. Appropriate color spaces and prominent colors are well known to those of skill in the art or can be determined heuristically. Each pixel of the image is classified to the closest cluster in the selected color space using a distance metric. Various such metrics are known to those of skill in the art, such as a physics-based color distance metric with respect to the mean values of the color clusters disclosed in Luo et al., "Towards physics-based segmentation of photographic color images," Proceedings of the IEEE International Conference on Image Processing, 1997.

A neighborhood window is next placed at each pixel in order to determine what neighborhood pixels are used to compute the local color histogram for this pixel. The window size is initially set at the size of the entire image, so that the local color histogram is the same as the one for the entire image and does not need to be recomputed. Next, an iterative procedure is performed between two alternating processes: re-computing the local mean values of each color class based on the current segmentation, and re-classifying the pixels according to the updated local mean values of color classes. This iterative procedure is performed until a convergence is reached. During this iterative procedure, the strength of the spatial constraints can be adjusted in a gradual manner (for example, the value of $\beta$, which indicates the strength of the spatial constraints, is increased linearly with each iteration). After the convergence is reached for a particular window size, the window used to estimate the local mean values for color classes is reduced by half in size. The iterative procedure is repeated for the reduced window size to allow more accurate estimation of the local mean values for color classes. This mechanism introduces spatial adaptivity into the segmentation process. Finally, a first stage segmentation of the image is obtained when the iterative procedure reaches convergence for the minimum window size.

In a second segmentation stage, regions from the first stage segmentation are combined into larger regions by perceptual grouping. Perceptual grouping can be non-purposive or purposive. Non-purposive perceptual grouping tends to eliminate over-segmentation due to large illumination differences, for example, a table or wall with remarkable illumination falloff over a distance. Purposive perceptual grouping is generally based on smooth, noncoincidental connection of joints between parts of the same object, and in certain cases models of typical objects (for example, a person has head, torso and limbs). Perceptual grouping facilitates the recognition of high-level vision features. Without proper perceptual grouping, it is difficult to perform object recognition and proper assessment of such properties as size and shape. Perceptual grouping includes: merging small regions into large regions based on similarity in properties and compactness of the would-be merged region (non-purposive grouping); and grouping parts that belong to the same object based on commonly shared background, compactness of the would-be merged region, smoothness in contour connection between regions, and model of specific object (purposive grouping).

Figure 2:
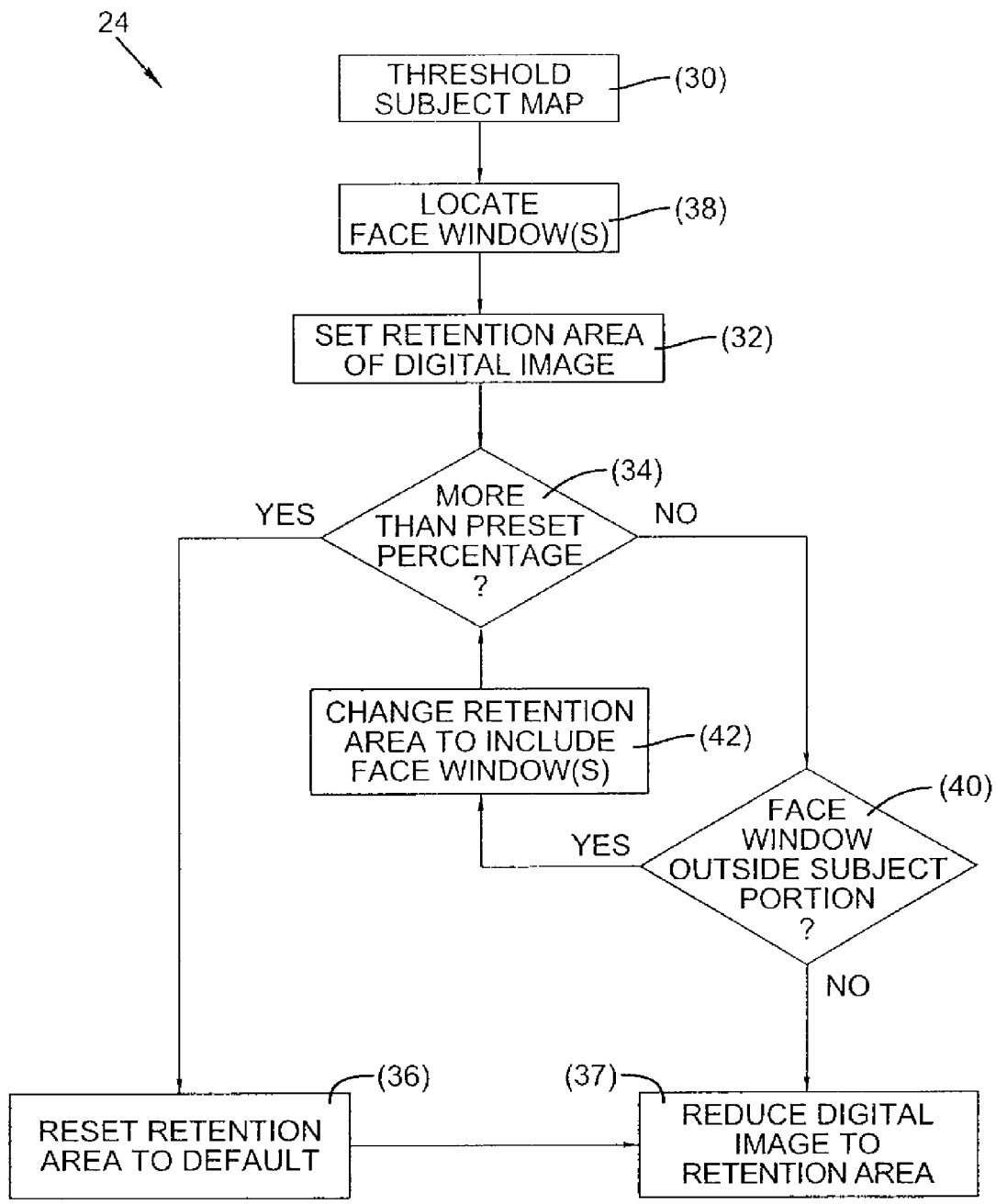
FIG. 2 is a detailed flow chart of the cropping step of the cropping method of FIG. 1.

In the methods, a main subject map has a plurality of regions, each having a respective subject value, is prepared from the digital image. The main subject map is used to determine a subject and a background of the digital image. This typically is done by thresholding. A variety of procedures can be used to generate the main subject map. Examples of main subject detection procedures include: center weighted detection, face detection, and uniform background removal. In the embodiment of FIGS. 1-2, the main subject map is the above-described main subject importance map and the subject values are importance values. For convenience, the following discussion is generally directed to that embodiment. It will be understood that like considerations apply to other embodiments.

Referring to FIG. 1, the region map and blended map are both input to a main subject importance detector (MSI) that uses those maps to generate a main subject importance map. The MSI relates the skin color values to respective segments and considers additional information in generating importance values for each of the regions of the main subject importance map. The additional information can be generated from the digital image and other maps, in any combination, and can also include auxiliary information, such as metadata associated with the digital image. Subject to the above constraints, the main subject importance detector can be any of the main subject detectors known to those of skill in the art.

A particularly suitable main subject detector is disclosed in U.S. Pat. No. 6,282,317, to Luo et al., which is hereby incorporated herein by reference. In that detector (also referred to hereafter as "MSD"), the regions are evaluated for saliency using two independent types of saliency features: structural saliency features and semantic saliency features. The structural saliency features include a set of low-level early vision features and a set of geometric features. Semantic saliency features are in the form of key subject matters, which are likely to be part of either foreground (for example, people) or background (for example, sky or grass), are detected to provide semantic cues as well as scene context cues. Examples of low-level early vision features are color, brightness, and texture. Examples of geometric features include location (centrality), spatial relationship (borderness, adjacency, surroundedness, and occlusion), size, shape, and symmetry. The semantic features include skin, face, sky, grass, and other green vegetation. Skin, faces, and people are semantic self-saliency features that tend to be in the foreground of images. In conjunction with shape analysis and pattern analysis, some detected skin regions can be identified as faces. Subsequently, using models of human figures, the detected skin and face areas can lead to clothing detection and eventually people detection.

For each feature, either or both of a self-saliency feature and a relative saliency feature are computed. The self-saliency is used to capture subjects that stand out (for example, in color, texture, location and the like), while the relative saliency is used to capture subjects that are in high contrast to their surrounding (for example, shape). Raw measurements of features are converted into evidences, whose values are normalized (for example, to be within [0, 1]), by belief sensor functions with appropriate nonlinearity characteristics. The evidences of both types of saliency features are integrated using a reasoning engine based on a Bayes net to yield the final belief map of the main subject.

In a particular embodiment, the structural saliency features considered by the MSD are limited to centrality and borderness. The main subject tends to be located near the center instead of the peripheral of the image, though not necessarily right in the center of the image. A centrality measure is defined by computing the integral of a probability density function (PDF) over the area of a given region. The PDF is derived from a set of training images, in which the main subject regions are manually outlined, by summing up the ground truth maps over the entire training set. In other words, the PDF represents the distribution of main subjects in terms of location. A more important advantage of this centrality measure is that every pixel of a given region, not just the centroid, contributes to the centrality measure of the region to a varying degree depending on its location.

$$\text{centrality} = \frac{1}{N_R} \sum_{(x,y) \in R} PDF_{MDSD\_location}(x, y)$$

where (x,y) denotes a pixel in the region R, $N_R$ is the number of pixels in region R, and $PDF_{MSD\_location}$ denotes a 2 dimensional probability density function (PDF) of main subject location. If the orientation is unknown, the PDF is symmetric about the center of the image in both vertical and horizontal directions, which results in an orientation-independent centrality measure. If the orientation is known, the PDF is symmetric about the center of the image in the horizontal direction but not in the vertical direction, which results in an orientation-aware centrality measure.

Borderness is a self-saliency feature. Many background regions tend to contact one or more of the image borders. In other words, a region that has significant amount of its contour on the image borders tends to belong to the background. The percentage of the contour points on the image borders and the number of image borders shared (at most four) can be good indications of the background. In the case where the orientation is unknown, one borderness feature places each region in one of six categories determined by the number and configuration of image borders the region is "in contact" with. A region is "in contact" with a border when at least one pixel in the region falls within a fixed distance of the border of the image. Distance is expressed as a fraction of the shorter dimension of the image. The six categories for borderness are the region is in contact with: none, exactly one, exactly two, exactly three, and exactly four of the image borders. If the proper orientation of the image is known, then the borderness feature can be refined to account for the fact that regions in contact with the top border are much more likely to be background than regions in contact with the bottom. This feature (borderness_a) places each region in one of 12 different categories determined by the number and configuration (top, bottom, left, right) of image borders the region is "in contact" with, using the definition of "in contact with" from above. Regions that include a large fraction of the image border are also likely to be background regions. This feature indicates what fraction of the image border is in contact with the given region.

$$\text{borderness\_b} = \frac{\text{perimeter\_pixels\_in\_this\_region}}{2 * (\text{image\_height} + \text{image\_width} - 2)}$$

When a large fraction of the region perimeter is on the image border, a region is also likely to be background. Such a ratio is unlikely to exceed 0.5, so a value in the range [0,1] is obtained by scaling the ratio by a factor of 2 and saturating the ratio at the value of 1.0.

$$\text{borderness\_c} = \frac{\min(1, 2 * \text{num\_region\_perimeter\_pixels\_on\_border})}{\text{region\_perimeter}}$$

All the above three borderness measures are separately trained. In a particular embodiment, only the borderness_a and borderness_c measures are used.

Semantic saliency features of skin and face are based on the revised map. Skin is provided directly by the skin color map. The skin color map is used with a face detector to output a belief in the location of faces in the digital image. A variety of different kinds of face detector can be used. In a particular embodiment, each region in the image that is identified as a skin region is fitted with an ellipse. The major and minor axes of the ellipse are calculated as also the number of pixels in the region outside the ellipse and the number of pixels in the ellipse not part of the region. The aspect ratio is computed as a ratio of the major axis to the minor axis. The belief for the face is a function of the aspect ratio of the fitted ellipse, the area of the region outside the ellipse, and the area of the ellipse not part of the region. A Gaussian belief sensor function is used to scale the raw function outputs to beliefs.

Other semantic saliency features can also be used, for example to differentiate the background. A number of objects that frequently appear in photographic images, such as sky, cloud, grass, tree, foliage, vegetation, water body (river, lake, pond), wood, metal, and the like are self saliency features and generally have a high likelihood to be background objects. Among these background subject matters, sky and grass (may include other green vegetation) are detected with relatively high confidence due to the amount of constancy in terms of their color, texture, spatial extent, and spatial location.

A probabilistic reasoning engine is used to generate the main subject importance map from the saliency features. In a particular embodiment a Bayes net-based inference engine is used. The Bayes net allows different evidences to compete with or contradict each other or, on the other hand, to mutually reinforce each other according to prior models or knowledge of typical photographic scenes. A Bayes net is a directed acyclic graph that represents causality relationships between various entities in the graph. The direction of links represents causality. A Bayes net has advantages such as, explicit uncertainty characterization, fast and efficient computation, quick training, high adaptivity and ease of building, and representing contextual knowledge in a human reasoning framework.

A Bayes net consists of four components: priors—the initial beliefs about various nodes in the Bayes net, conditional probability matrices (CPMs)—the statistical relationship between two connected nodes in the Bayes net, evidences—observations from feature detectors that are input to the Bayes net, and posteriors—the final computed beliefs after the evidences have been propagated through the Bayes net.

A two-level Bayesian net is used in the MSD. Conditional independence is assumed between various feature detectors. The main subject is determined at a root node. All of the feature detectors are at leaf nodes. There is one Bayes net active for each region of the digital image. The root node gives the posterior belief that a respective region is part of the main subject. As an alternative, the Bayes net can have more than two levels.

One advantage of Bayes nets is that each link is assumed to be independent of other links at the same level. It is therefore convenient to train the entire net by training each link separately, that is, deriving the CPM for each link independent of others. In general, two methods are used for obtaining CPM for each root-feature node pair: using expert knowledge and using contingency tables. Either or both methods can be used here. Use of expert knowledge is an ad-hoc method. An expert is consulted to obtain the conditional probabilities of each feature detector observing the main subject. Use of contingency tables is a sampling and correlation method. Multiple observations of each feature detector are recorded along with information about the main subject. These observations are then compiled together to create contingency tables which, when normalized, can then be used as the CPM. This method is similar to neural network type of training (learning).

Consider the CPM for centrality as an example. This matrix was generated using contingency tables derived from the ground truth and the feature detector. Since the feature detector in general does not supply a binary decision, fractional frequency count is used in deriving the CPM. The entries in the CPM are determined by $$CPM = \left[\left(\sum_{i \in I}\sum_{r \in R_i} n_i F_r^T T_r\right) P\right]^T$$

where $F_r = [f_0^r f_1^r \ldots f_M^r]$, $T_r = [t_0^r t_1^r \ldots t_L^r]$, $P = \text{diag}\{p_j\}$, $$p_j = \left(\sum_{i \in I}\sum_{r \in R_i} n_i t_r\right),$$

I is the set of all training images,
$R_i$ is the set of all regions in image i,
$n_i$ is the number of observations (observers) for image i,
$F_r$ represents an M-label feature vector for region r,
Tr represents an L-level ground-truth vector, and
P denotes an L×L diagonal matrix of normalization constant factors.

All the belief values are normalized by the proper belief sensors. As an intuitive interpretation of the first column of the CPM for centrality, a "central" region is about twice as likely to be the main subject than not a main subject.

The output of the MSD is a list of the segments in rank order of importance. The list yields importance values of 1 to 255, with likelihood of main subject increasing with magnitude. The importance values can be associated with the respective segments to provide a main subject importance map.

In a particular embodiment, the input to the MSD is limited to a largest predetermined number of segments. A currently preferred number is 255 segments. Any remaining segments of smaller size are treated as background.

Referring to FIG. 1, in a particular embodiment a digital image is initially received and displayed to the user along with indicia indicating the option of automatic (machine-controlled) cropping. The user can also be given an alternative option of manual cropping. The user selects a desired cropping or no cropping by providing an appropriate input. The user input is accepted and the automatic cropping method begins. The manner in which the image and cropping selection information are displayed and the user input is accepted are not critical. A wide variety of ways are well known to those of skill in the art. For example, the image can be shown on a display of a computer system along with text specifying options of automatic cropping, manual cropping, and no cropping. The user input can be made by moving a cursor onto one of the selections and clicking a mouse key. If manual cropping is selected, then that feature is provided in a manner well known to those of skill in the art. If automatic cropping is selected, then a main subject map is determined and cropping is provided using that map, as follows, without further user intervention. The cropped image is output.

The manner of output is not critical. The cropped image can be displayed or printed or otherwise provided. The cropped image can be shown without the original image or together with the original image. The cropped image can also be shown by an outline or the like on the original image.

Referring now to FIG. 2, in the cropping step (24), the main subject map is thresholded (30) to define a main subject and background. In a particular embodiment, the main subject importance map is quantized to three levels of importance (high, medium, and low) to provide a thresholded main subject importance map. The levels can use predetermined thresholds, but it is preferred that levels are adaptive to clustering by the saliency features used in the MSD output map. In a particular embodiment, the levels are adaptive to first level clustering of the saliency features using K-means clustering. The subject of the image is defined as the high importance regions plus any medium importance region that touches a high importance region. The remainder of the image is defined as background.

A retention area or retention portion is then set (32). The retention area is the portion of the image that is retained after cropping. (The physical limits of the retention area are referred to herein as the "chopping boundaries".) The retention area is fully inclusive of the subject portion and minimally inclusive of the background portion of the image. The retention area has a predetermined shape. A variety of shapes can be used, but it is currently preferred that the retention area have a rectangular shape. It is further preferred that the aspect ratio of the rectangular retention area be determined as a part of the cropping. As an alternative, the aspect ratio can be set to a fixed value, either as a default or a user selection.

The retention area is then checked (34) to determine whether the retention area includes more than a preset percentage of the digital image. If so, the retention area is reset (36) to a default crop. It is currently preferred that the preset percentage of the original image is 80 to 100 percent. The reduced size retention area provides the cropping expected by the user, when the user selects automatic (machine-controlled) cropping. The extent of reduction is predetermined and, for simplicity, is preferably a constant that is independent of the main subject importance map. The reset retention area is preferably between 50 and 80 percent of the original image. The extent of reduction can be varied with the main subject importance map, but this can present a risk of recursive resetting, in which repeated attempts to define the retention area fail to reduce the retention area. The reset retention area provided by the default crop can be the preset percentage or can be a smaller percentage of the digital image. In a particular embodiment, the preset percentage is the entirety of the digital image and the default crop is a smaller percentage. The reset retention area can exclude part or all of the subject portion. As a final step, the digital image is reduced (37) to the area within the cropping boundaries defining the respective retention area.

In a particular embodiment, prior to said cropping, face windows are determined (38) and the retention area is set (32) to include the face windows and the main subject. This step solves a potential problem in the main subject importance map. The Bayes network is a probabilistic method that is created using a training set. The probabilistic nature of the network and possible inadequacies of the training set, make it possible that important objects could be given low importance values. The face windows are applied independently of the main subject importance map, overcoming potential shortcomings in that map.

The face windows are each larger than a corresponding face in the digital image, in order to provide a buffer zone that includes hair and other subject matter around the face that a user would want to keep when cropping. The face windows can be determined by any type of face detector, such as those earlier discussed. In a particular embodiment, the face windows are provided by providing a rectangle of a predetermined oversize ratio on each of the face zones determined as input the MSD. This approach has the advantage of efficiency, since the results of face detection are used twice. As an option, the face zones can be filtered to remove one or more face zones having particular criteria from inclusion in the face windows. For example, face zones below a preset size can be excluded. Criteria can be based on the main subject map.

In this embodiment, if the retention area has been checked and does not include more than a preset percentage of the digital image, a second check is made (40) as to whether a face windows is outside the subject portion of the image that was used to determine the retention portion. If so, the retention area is changed (42) to include the face window or windows and the preset percentage check (34) is repeated. It will be understood that the steps relating to determining the retention area can be carried out in a variety of ways so as to achieve the same effect. For example, the steps relating to the face windows can be combined into earlier steps prior to the preset percentage check.

A variety of additional features can be added to the above-described procedures. For example, a maximum zoom control can be provided to give an acceptable range for the maximum zoom. This can be provided with or without input from the user. This gives the user ability to avoid the cases where the auto zoom algorithm over magnifies a small area of the original image.

Digital processing of images in the methods herein is not limited to the procedures described. Other algorithms, such as sharpening or other structure correction, exposure balancing, and tilt and other scene correction, can also be used before or after other procedures described herein.

In an alternative embodiment of the invention, the digital image is cropped, but the cropped image is only used for analysis to be used in modifying the original image. For example, tone scale balance can be considered in the cropped image and then be applied to the original image. In this case, the balancing can be a simple as adjusting the mean density of all the color records of the cropped region to an 18 percent gray level and then applying that same balancing to the original image.

The invention has been described in detail with particular reference to certain preferred embodiments thereof, but it will be understood that variations and modifications can be effected within the spirit and scope of the invention.

The invention claimed is:

1. A method for mapping a digital image having a plurality of pixels, the method comprising the steps of:
  computing a skin color map of the digital image, said skin color map having a plurality of skin color values, each of said skin color values being associated with a respective set of one or more of said pixels, each of said skin color values indicating a likelihood that the respective said pixel set is skin;
  generating a face map of the digital image, said generating being independent of said computing, said face map being divided into one or more face zones and a background exclusive of said face zones, each of said face zones being a group of said pixels, each of said face zones indicating a greater likelihood than said background that the respective said group of pixels is a face;

blending the skin color map and the face map by increasing skin color values associated with the pixels of face zones providing a revised map that differentiates face skin color from other areas in the revised map;

segmenting the digital image into a plurality of regions to provide a region map, said segmenting being independent of said computing and generating;

calculating a main subject importance map from said region map and said revised map, said main subject importance map having a plurality of importance values, each of said importance values being associated with a respective region in the region map, each of said importance values indicating a likelihood that the respective said region is of importance to a main subject of the digital image;

cropping said digital image without user intervention based on said main subject importance map to provide a cropped digital image; and outputting said cropped digital image.

2. The method of claim 1 wherein said calculating further comprises:

designating each of one or more of said regions as a skin region based on said revised map;

computing at least one geometric feature of each of said skin regions; and wherein said importance values are based upon said revised map and respective said geometric features.

3. The method of claim 2 wherein said geometric features are selected from the group consisting of: a centrality feature and a borderness feature.

4. The method of claim 3 further comprising, prior to said cropping:

determining a main subject using said main subject importance map;

determining one or more face windows, each of said face windows being at least as large as and inclusive of a respective one or more of said face zones;

cropping said digital image to a cropping boundary inclusive of the larger of said main subject and a rectangular area inclusive of all of said face windows.

* * * * *